(12) United States Patent
Tzoref-Brill (10) Patent No.: US 9,015,012 B2
(45) Date of Patent: Apr. 21, 2015

(54) COMPLETION OF PARTIAL COVERAGE TASKS

(75) Inventor: Rachel Tzoref-Brill, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 13/540,632

(22) Filed: Jul. 3, 2012

(65) Prior Publication Data

US 2014/0012560 A1     Jan. 9, 2014

(51) Int. Cl.
*G06F 17/50*     (2006.01)
*G06F 11/36*     (2006.01)

(52) U.S. Cl.
CPC ..................... *G06F 11/3676* (2013.01)

(58) Field of Classification Search
USPC ............ 703/2, 13, 14; 716/106, 103; 714/738
See application file for complete search history.

(56) References Cited

U.S. PATENT DOCUMENTS

| | | | |
|---|---|---|---|
| 6,175,946 B1 * | 1/2001 | Ly et al. | 716/103 |
| 6,609,229 B1 * | 8/2003 | Ly et al. | 716/103 |
| 6,718,521 B1 | 4/2004 | Bentlage et al. | |
| 7,617,468 B2 * | 11/2009 | Thakur et al. | 716/106 |
| 7,904,846 B2 * | 3/2011 | Thakur et al. | 716/52 |
| 2009/0037859 A1 * | 2/2009 | Thakur et al. | 716/5 |

OTHER PUBLICATIONS

Yang, et al., "Test-Cost Sensitive Classification on Data with Missing Values", IEEE Transactions on Knowledge and Data Engineering, vol. 18, No. 5, May 2006.

\* cited by examiner

*Primary Examiner* — Thai Phan
(74) *Attorney, Agent, or Firm* — Ziv Glazberg (57) ABSTRACT

A method, apparatus and product for completion of partial coverage tasks. The method comprising obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

20 Claims, 4 Drawing Sheets

COMPLETION OF PARTIAL COVERAGE TASKS

TECHNICAL FIELD

The present disclosure relates to functional coverage in general, and to the use of partial functional coverage tasks, in particular.

BACKGROUND

Omissions are a major risk in testing. Test planning techniques are a well known way to improve the quality of testing by reducing both omissions and redundancy. These techniques try to prevent omissions in advance (i.e., before tests are implemented and executed) by selecting what to test out of a possibly enormous test space, in a way that reduces as much as possible the risk of bugs escaping to the field. One such known technique is Combinatorial Test Design (CTD).

Functional coverage analysis techniques are another well known way to detect omissions and increase the quality of testing. Coverage analysis measures how well executed tests covered the test-space. Coverage analysis measures the execution of tests against a functional model of the System Under Test (SUT) and reports which aspects are missing and which are covered by the executed tests.

Both test planning and functional coverage analysis require modeling of the test space as a functional coverage model. The test space can represent inputs, scenarios, configurations, the application's internal state, or any other aspect that one is interested in testing. Traditionally, the functional coverage model consists of a set of functional attributes, respective domains of values for each attribute, and restrictions on the value combinations. The restrictions may be Boolean expressions defining when value combinations are valid or invalid. Restrictions may be represented in other manners as well, such as by explicitly enumerating all valid or all restricted combinations of values. The set of valid value combinations, i.e. all combinations from the Cartesian product of the values that pass the restrictions, define the space to be tested.

A functional coverage is measured with respect to a functional coverage model. The functional coverage model defines a triplet: functional attributes, a domain for each functional attribute, and a set of restrictions. The functional attributes may be any attribute of the SUT, such as for example a type of web browser being used, an underlying Operating System, a number of threads operating, whether the output was printed. The domains may define for each attribute a set of possible values. For example, the web browser may be Microsoft® Internet Explorer®, Google® Chrome®, or Mozilla Firefox™. Similarly, the operating system may be Microsoft® Windows®, or Linux™. The cross-product of the different combinations of the attributes defines a functional coverage test-space. The test-space comprises a set of coverage tasks, each representing functional requirements to be tested: one requirement per functional attribute, and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks.

The functional coverage model may further comprise a set of restrictions defining a series of values of different attributes that may not appear together. For example, consider a functional coverage defining two attributes: ACTION and USER. The ACTION attribute may be each of the following values: RETRIEVE, STORE, and MODIFY PERMISSION. The USER attribute may be each of the following values: ADMIN, USER, GUEST. In some cases, a guest user cannot modify permission. A restriction may be defined to indicate that the couple (GUEST, MODIFY PERMISSION) is not a valid couple. The fact that a trace does not comprise an entry covering a coverage task that includes the couple does not affect the functional coverage. In other words, all possible coverage tasks—which together form the maximal possible coverage with respect to a functional coverage—do not include any coverage task that comprises the restricted couple. It will be understood that restrictions may be defined with respect to a combination of values of different attributes, and not necessarily with respect to a complete tuple of values. Furthermore, the restriction may be any constraint on combination of values, which may be represented using a Boolean formula over the functional attributes and associated values.

BRIEF SUMMARY

One exemplary embodiment of the disclosed subject matter is a computer-implemented method, the method performed by a processor, the method comprising: obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

Another exemplary embodiment of the disclosed subject matter is a computerized apparatus having a processor and a memory, the processor being adapted to perform the steps of: obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

Yet another exemplary embodiment of the disclosed subject matter is a computer program product comprising a non-transitory computer readable medium retaining program instructions, which instructions when read by a processor, case the processor to performs the steps of: obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to utilize a partial coverage task. Generally, functional coverage is measured based on one or more coverage tasks. A coverage task may indicate a task according to a functional model that was executed or is to be executed, such as a test which was developed and/or executed.

It will be noted that in some cases, such as in test planning, existing tests, defined using coverage tasks, may be useful information. As an example only, test planning techniques can take these existing tests into account, and suggest complementary test plans that do not attempt to cover what is already covered by the existing tests. They can also select a subset of the existing tests that maintains the same coverage as the entire existing test suite. It will be noted that in some cases implementing new tests may be costly and it may preferred to rely on existing tests.

However, in some cases, only partial coverage tasks are available. A partial task comprises at least one functional attribute for which a value is not assigned and it is left unknown.

In some exemplary embodiments, the value of the functional attribute could not be retrieved from documentation of the existing tests, from a log of execution of the test, or from any other source. In some exemplary embodiments, test documentation is used to retrieve information about the existing tests. The documentation may be prone to omissions which results in partial coverage tasks.

It will be noted that in some cases, there may be several partial coverage tasks. Each partial coverage task may omit value assignment in different sets of functional attributes. In some cases, partial coverage tasks may still be used for coverage analysis, test selection, test augmentation, or the like, but with reduced accuracy of the results.

One technical solution is to use the functional coverage model in order to enhance partial coverage tasks. The unspecified functional attributes' values can sometimes be deduced from the values of other variables, based on model restrictions. For example, cases of mutual exclusion, or value combinations that force the values of other functional attributes.

In some exemplary embodiments, the enhanced partial coverage tasks increase the accuracy of the results of coverage analysis, test selection, test augmentation, or similar coverage task-based activities, with respect to the results which are based on the partial coverage tasks.

In some exemplary embodiments, based on the assignment of values to the subset of functional attributes, and based on the restrictions, it may be determined with respect to an unassigned functional attribute whether there are more than one potential assignments that would be valid. If there is exactly one potential assignment—the partial coverage task may be modified to include that value. If there are two or more alternative valid values, the value of the functional attribute may be left undefined.

In some exemplary embodiments, a symbolic representing of the test-space may be utilized, such as Binary Decision Diagram (BDD) to efficient represent the functional coverage test-space and to deduce whether or not for a functional attribute there is exactly one valid value. Use of BDDs in functional models is disclosed in U.S. patent application Ser. No. 13/360,811 to Tzoref-Brill et al. entitled "BDD-Based Functional Coverage Analysis" filed 30 Jan. 2012, which is hereby incorporated by reference.

Additionally or alternatively, symbolic methods, such as a Boolean Satisfiability Problem (SAT) solving, may be used to determine potential values of the unassigned functional attributes. As an example, a SAT problem may be defined relating to an assignment of the values to a subset of the functional attributes as defined by the partial coverage task and hold the restriction defined by the functional coverage model. Solving the SAT problem, such as by a SAT solver, may determine one potential assignment of value to each unassigned functional attribute. A second SAT problem may be defined based on the SAT problem and requiring that at least one of the unassigned functional attributes be different than in the previously determined assignment. Based on the determination—whether there exists a satisfying assignment or not, there may be determined if there are more than one potential valid assignments.

Similarly to the above, Quantified Boolean Formula (QBF) solving, Constraint Satisfaction Problem (CSP) solving, theorem proving and other methods may be used.

One technical effect of the disclosed subject matter maybe providing better information to be used in functional coverage methods. The enhanced coverage task contains more complete information regarding the coverage of existing tests, executed tests, or the like. Such information may contribute to the accuracy and efficiency of test planning and coverage analysis, or similar techniques.

In some exemplary embodiments, partial coverage tasks may be discarded. The disclosed subject matter may have the effect of avoiding such a result. Additionally or alternatively, partial coverage tasks may be used (such as, for example, to determine certain pair-wise coverage goals were reached), and therefore enhancing the partial coverage task with additional information may be desirable even if the enhanced coverage task is still a partial coverage task.

Figure 1:
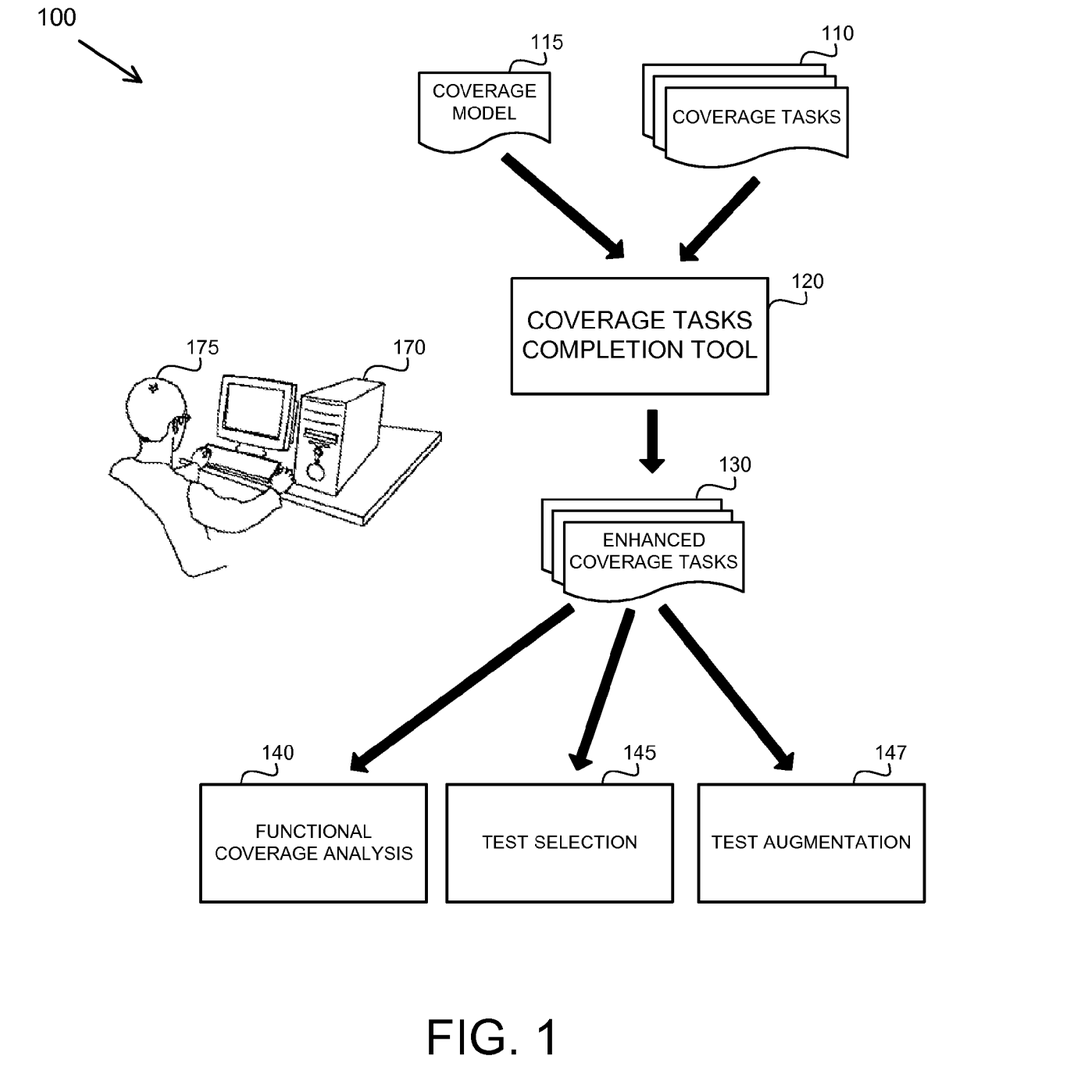
FIG. 1 shows a conceptual illustration of a computerized environment, in accordance with some embodiments of the disclosed subject matter.

Referring now to FIG. 1, showing a conceptual illustration of a computerized environment, in accordance with some embodiments of the disclosed subject matter. A Computerized Environment 100 may comprise one or more computerized tools.

In some exemplary embodiments, a User 175, such as a developer, a QA staff member, a tester, a designer, a verification engineer or the like, may interact with Computerized Environment 100. User 175 may utilize a Man-Machine Interface (MMI) 170 such as a terminal, a display, a keyboard, an input device or the like to interact with a computer (not shown).

Coverage Tasks 110 may be received, such as from a trace, a log, based on a manual documentation of tests. Coverage Tasks 110 may describe coverage tasks that were covered during testing phase. Additionally or alternatively, Coverage Tasks 110 may describe tests that are available for testing the SUT. Such information may be used for test planning methods, such as test selection, CTD, or the like.

In some exemplary embodiments, Coverage Tasks 110 may include one or more partial coverage tasks.

Coverage Tasks Completion Tool (CTCT) 120 may be a computerized tool, such as implemented in software, hardware, combination thereof, or the like. CTCT 120 may be executed by a computerized device, such as but not limited to a computer which User 175 interacts with. CTCT 120 may enhance partial coverage tasks in accordance with the disclosed subject matter. The partial coverage tasks may be enhanced by additional information that is deduced in view of the partial information present in the partial coverage task. CTCT 120 may deduce the additional information based on Coverage Model 115 describing the functional coverage model, including restrictions on combination of values of coverage tasks. For some or all of the partial coverage tasks, CTCT 120 may determine Enhanced Coverage Tasks 130.

Enhanced Coverage Tasks 130 may be used in various engines or modules that utilize coverage tasks as input, such as but not limited to Functional Coverage Analysis 140 and Test Selection 145. Additionally or alternatively, Test Augmentation 147 may suggest new tests that cover the gaps of the existing test represented by Enhanced Coverage Tasks 130. In some exemplary embodiments, Enhanced Coverage Tasks 130 may be partial coverage tasks and may be used nonetheless. In some exemplary embodiments, any non-enhanced coverage task (e.g., non-partial coverage tasks and/or partial coverage tasks that could not be enhanced) may be used as input together with Enhanced Coverage Tasks 130.

In some exemplary embodiments, User 175 may monitor the completion, such by inspecting completed values of the enhanced coverage tasks, accepting or declining added information, or the like. User 175 may decide which of the Enhanced Coverage Tasks 130 to utilize and to what purpose.

Figure 2A:
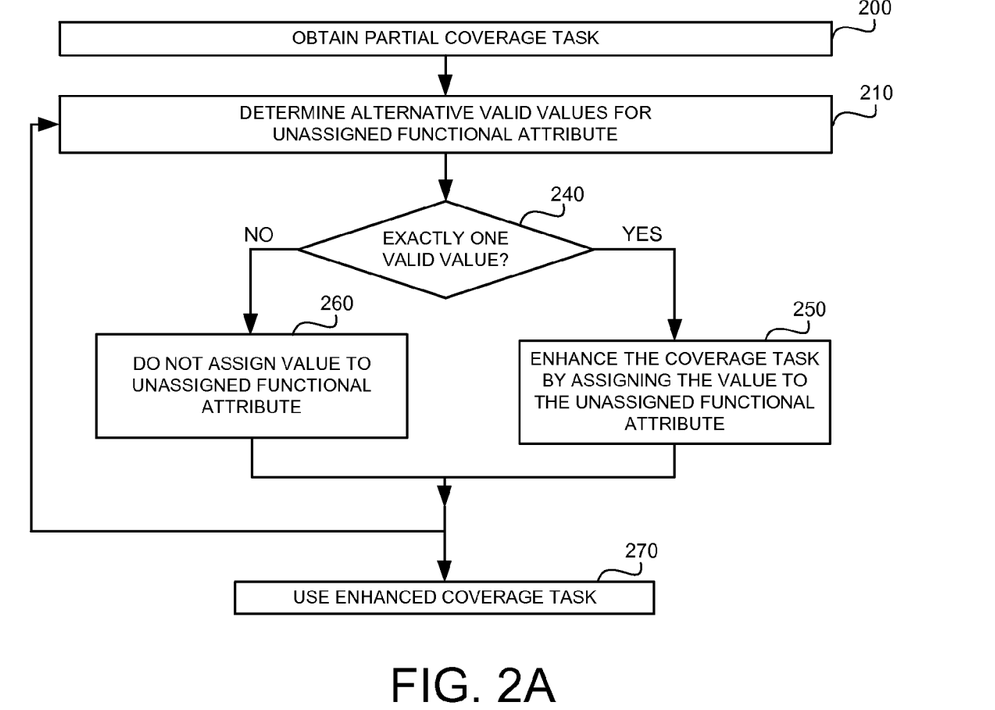
FIG. 2A-2C show flowcharts of methods for completing partial coverage tasks, in accordance with some embodiments of the disclosed subject matter.

Referring now to FIG. 2A showing a flowchart of a method for completing partial coverage tasks, in accordance with some embodiments of the disclosed subject matter.

In Step 200, a partial coverage task may be obtained. In some exemplary embodiments, several partial coverage tasks are obtained.

Based on the partial assignments of values and restrictions defined by the functional coverage model, it may be determined whether or not there is exactly one possible value assignment to an unassigned functional attribute, also referred to as a singleton value.

In Step 210, alternative valid values for an unassigned functional attribute are determined. In some exemplary embodiments, it may be determined whether there is one value or at least two alternative values.

In Step 240, it may be determined whether there is exactly one valid assignment (i.e., a singleton value) for the functional attribute. In case there is a singleton value (Step 250), the partial coverage task may be enhanced by assigning the singleton value to the unassigned functional attribute. Otherwise (Step 260), the partial coverage task may remain unmodified and no value may be assigned to the unassigned functional attribute.

In some exemplary embodiments, Steps 210, 240, 250 and 260 may be performed repeatedly with respect to a different unassigned functional attribute. It will be noted that a singleton value may exist for a first unassigned functional attribute but not for a second unassigned functional value.

In some exemplary embodiments, in Step 270, the enhanced coverage task may be used, such as in test selection, coverage analysis or the like.

Figure 2B:
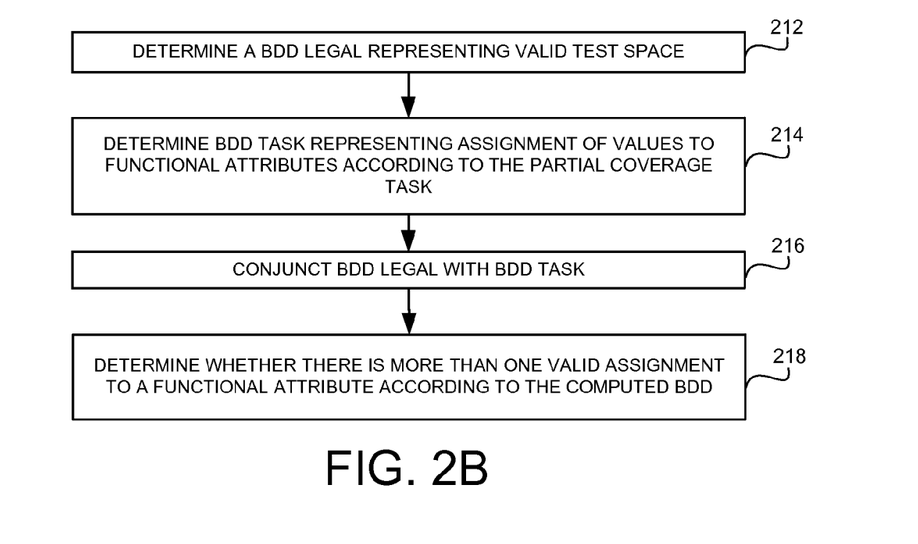

Referring now to FIG. 2B showing a flowchart for a method using BDDs, in accordance with some embodiments of the disclosed subject matter.

In Step 212, a BDD legal representing valid test space may be determined The BDD legal may be a BDD which excludes from the Cartesian cross product of the functional attributes those combinations which are invalid in view of restrictions.

In Step 214, A BDD task may be determined The BDD task may represent the partial coverage task by assigning values to the assigned functional attributes according to the partial coverage task. In some exemplary embodiments, BDD task represents all possible completion of the partial coverage tasks to tasks. However, some of the completions may be invalid due to violating a restriction.

In Step 216, BDD legal may be conjuncted with the BDD task, thereby determining a new BDD which represents all valid coverage tasks that match the partial coverage task (also referred to as valid completing tasks).

In Step 218 it may be determined whether there is more than one valid assignment to a functional attribute according to the computed BDD. It will be noted that in some cases, there may be a plurality of valid completing tasks but one or more unassigned functional attribute may still have a singleton vale. As an example only, consider the following partial coverage task: (OS=unassigned; Browser=IE; TimeOfDay=unassigned). Though the unassigned attribute "TimeOfDay" may be assigned many different values, it may be determined that the OS is "Windows" in view of a restriction that restricts the OS to only be Windows in case that the Browser is IE. It will be noted that in some cases, the singleton value is determined in view of several restrictions and in view of several values of assigned functional attributes.

Figure 2C:
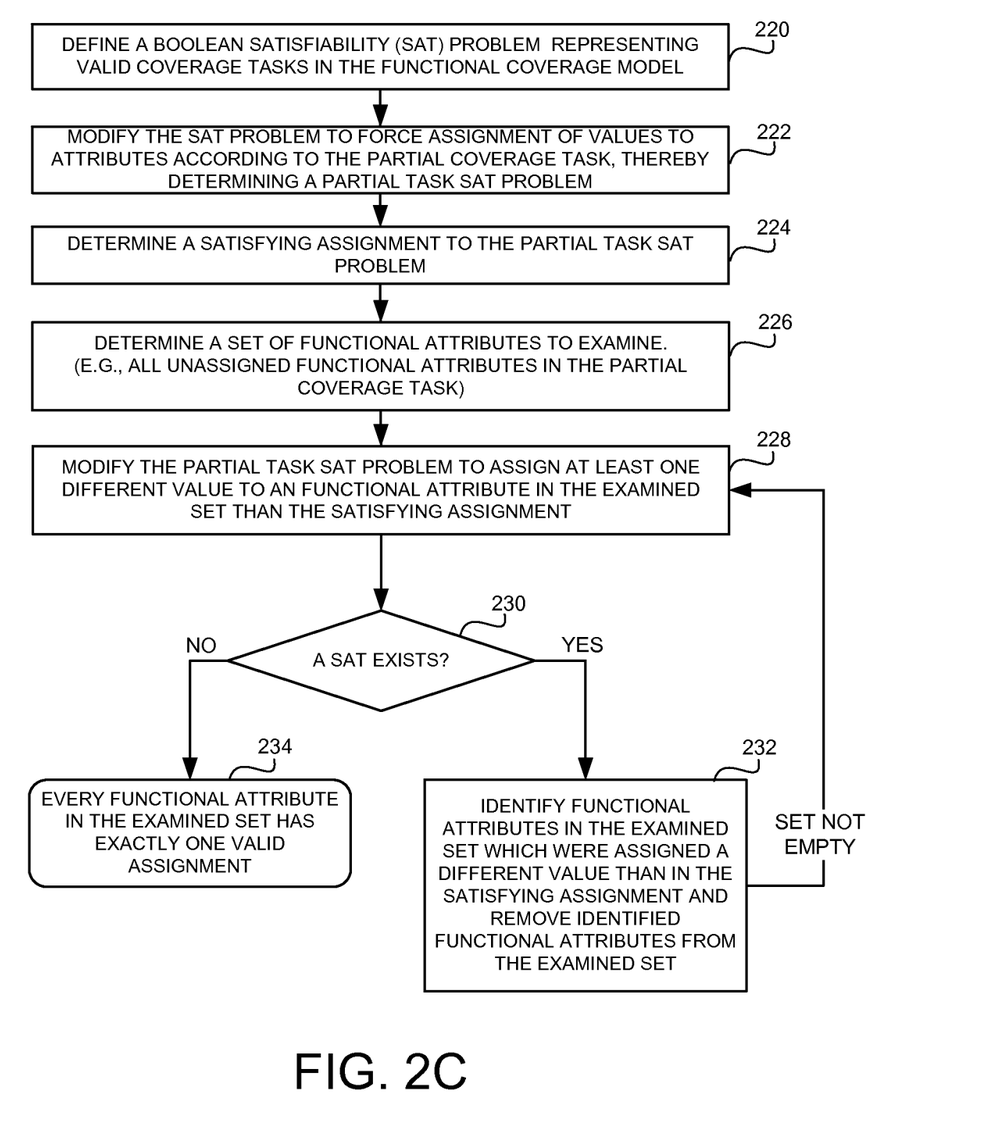

Referring now to FIG. 2C showing a flowchart for a method using SAT solver or a similar satisfiability problem solver, in accordance with some embodiments of the disclosed subject matter.

In Step 220, a SAT problem representing a valid coverage task in the functional coverage model may be determined The SAT problem may comprise variables associated with the functional attributes and being assignable with values that are mapped to the corresponding domains, and constraint excluding assignments of values that are restricted. In some exemplary embodiments, by solving the SAT solver a valid coverage task can be determined.

In Step 222, the SAT problem may be modified to a partial task SAT problem. The partial task SAT problem may force assignment of values according to the partial coverage task, such as by adding appropriate constraints. In some exemplary embodiments, by solving the partial task SAT problem a valid completing coverage task may be determined.

In Step 224, a satisfying assignment to the partial task SAT problem may be determined, such as using a SAT solver.

In Step 226, a set of functional attributes to examine may be determined, also referred to as Examined Set. In some exemplary embodiments, all or some of the unassigned functional attributes may be added to the Examined Set.

In Step 228, the partial task SAT problem may be modified so that it will be constrained to assign a different value than in the assignment of Step 224 to at least one functional attribute in the Examined Set. For example, in case the set comprises functional attributes denoted as $f_1, f_2, f_3, f_4$ which are assigned in the assignment of Step 224 the values of $v_1, v_2, v_3, v_4$ respectfully, then the added constraint may be $(f_1 \neq v_1) \vee (f_2 \neq v_2) \vee (f_3 \neq v_3) \vee (f_4 \neq v_4)$. In accordance with such a construction, if one of the functional attributes has a singleton value but another does not, the SAT problem may be satisfiable.

In Step 230, it may be determined whether the SAT problem of Step 228 is satisfiable or not, such as using a SAT solver. In a satisfying assignment is found, Step 232 may be performed. Otherwise, if an UNSAT is determined, Step 234 may be performed.

In Step 232, any functional attribute that is a member of the Examined Set which was assigned a different value than that assigned in the assignment of Step 224 can be determined to not have a singleton value. Any such functional attribute may be removed from the Examined Set. In case the set is not empty, Step 228-230 may be performed once more with respect to the reduced Examined Set, so as to determine whether the rest of the functional attributes have singleton values or not.

In Step 234, and in case an UNSAT is determined in Step 230, then it can be determined that any member of the Examined Set has a singleton value. The singleton value is the value in accordance with the satisfying assignment of Step 224. In some exemplary embodiments, the partial coverage task may be enhanced by assigning the singleton value to the unassigned functional attribute.

Both by using SAT problems (or similar satisfiability problems and/or solvers) and by using BDDs, the disclosed subject matter provides for a symbolic manner to represent the valid completing coverage tasks of a partial coverage task. In some exemplary embodiments, a symbolic representation of the valid test space in accordance with the functional coverage model may be determined and therefore any coverage task that is not a valid completing coverage task of the partial coverage task may be excluded. Based on the symbolic representation, whether there is exactly one valid assignment to the unassigned functional attribute.

Figure 3:
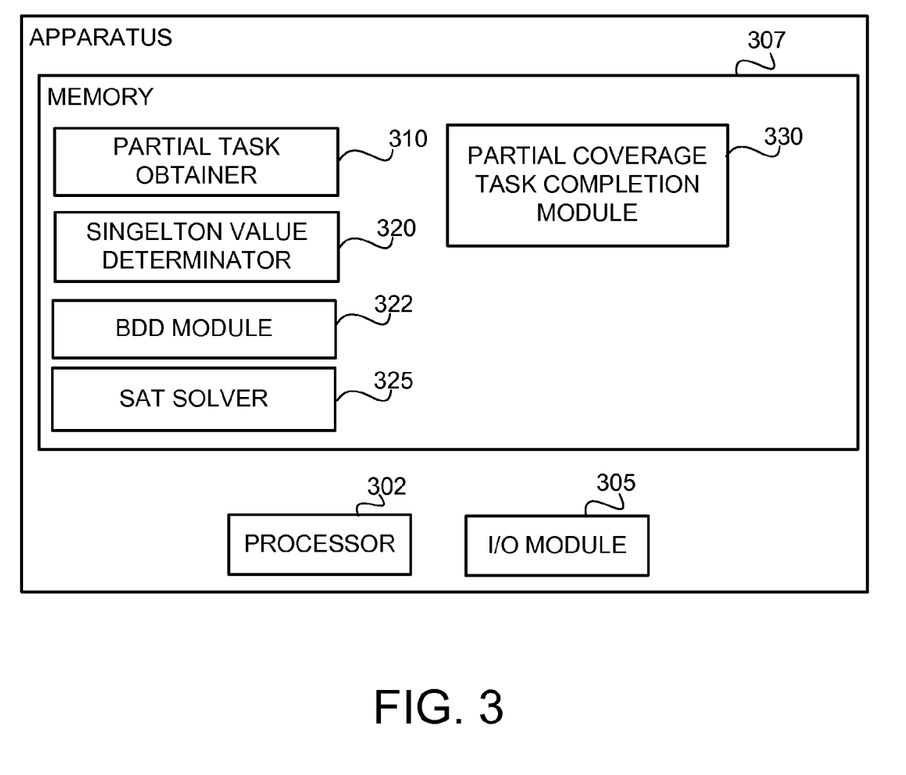
FIG. 3 shows a block diagram of components of an apparatus, in accordance with some exemplary embodiments of the disclosed subject matter.

Referring now to FIG. 3 showing a block diagram of components of an apparatus, in accordance with some exemplary embodiments of the disclosed subject matter.

An Apparatus 300, such as CTCT 120, may be configured to enhance a partial coverage task. Apparatus 300 may generate Enhanced Coverage Tasks 130 based on partial overage tasks and based on a coverage model.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents. Processor 302 may be configured to execute computer-programs useful in performing the method of FIGS. 2A-2C.

In some exemplary embodiments of the disclosed subject matter, Apparatus 300 may comprise an Input/Output (I/O) Module 305. I/O Module 305 may be utilized to provide an output to and receive input from a user. However, it will be understood the Apparatus 300 may be utilized without user intervention. In some exemplary embodiments, I/O Module 305 may be utilized to obtain, such as from a digital source, from a user, or the like, Coverage Tasks 110 and/or Coverage Model 115. In some exemplary embodiments, I/O Module 305 may be used to output Enhanced Coverage Tasks 130, such as in a form of a computer-readable medium, to other tools, such as in order to perform additional processing of the coverage tasks (e.g., 140, 145, 147 of FIG. 1).

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps shown in FIG. 2 above. Memory Unit 307 may be used to retain partial coverage tasks, enhanced coverage tasks, symbolic representation of the valid completing coverage tasks, the functional coverage model, or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

Partial Task Obtainer 310 may be configured to obtain, such as from a user, from a file, or the like, partial coverage tasks. Partial Task Obtainer 310 may be used to perform Step 200.

Singleton Value Determinator 320 may be configured to determine, with respect to an unassigned functional attribute, all valid completing tasks have the same value. In some exemplary embodiments, the singleton value may be the only value that does not violate the restrictions of the functional coverage model after assigning values in accordance with the partial coverage task. In some exemplary embodiments, Singleton Value Determinator 320 may be used to perform steps 210, 240 of FIG. 2.

In some exemplary embodiments, Singleton Value Determinator 320 may be operatively coupled to a BDD Module 322 useful for performing BDD computations. In some exemplary embodiments, Singleton Value Determinator 320 and BDD Module 322 may be used to perform the steps of FIG. 2B.

In some exemplary embodiments, Singleton Value Determinator 320 may be operatively coupled to a SAT Solver 325 useful for solving SAT problems. In some exemplary embodiments, Singleton Value Determinator 320 may define SAT problems and utilize SAT Solver 325 to determine whether the SAT problems are satisfiable or not. Additionally or alternatively, SAT Solver 325 may determine a satisfying assignment, when possible. In some exemplary embodiments, SAT Solver 325 and Singleton Value Determinator 320 may be used to perform the steps of FIG. 2C.

Partial Coverage Task Completion Module 330 may be configured to add to partial coverage task information determined by Apparatus 300. In some exemplary embodiments, Partial Coverage Task Completion Module 330 may assign to an unassigned functional attribute of the partial coverage task a singleton value determined by Singleton Value Determinator 320. In some exemplary embodiments, a plurality of unassigned functional attribute may each be assigned its respective singleton value.

It will be further noted that in the present disclosure and in the claims, the term Binary Decision Diagrams (BDDs) may refer to BDDs and variations thereof, such as for example Zero-suppressed Decision Diagrams (ZDDs), Multi-Terminal Decision Diagrams (MTDDs), Multi-Valued Decision Diagram (MDDs), and Binary Moment Diagrams (BMDs).

Generally, ZDDs are a version of BDDs where instead of introducing a node in the diagram when the result of the function is different between the 'true' and 'false' assignments to the corresponding variable, a node is introduced when the 'false' assignment to the corresponding variable results in evaluating the function to anything different than the constant 'false'. ZDDs are disclosed in A. Mishchenko, "An Introduction to Zero-Suppressed Binary Decision Diagrams", Proceedings of the 12th Symposium on the Integration of Symbolic Computation and Mechanized Reasoning, 2001, which is hereby incorporated by reference in its entirety.

Generally, MTDDs are an extension of BDDs where the function can evaluate to more than two values, i.e., have multiple terminal nodes. MTDDs are disclosed in M. Fujita et al., "Multi-Terminal Binary Decision Diagrams: An Efficient Data Structure for Matrix Representation", Formal Methods in System Design—FMSD, vol. 10, no. 2/3, pp. 149-169, 1997, which is hereby incorporated by reference in its entirety.

Generally, MDDs are a generalization of BDDs where the domains of the variables can be multi-valued. MDDs are disclosed in R. Brayton et al., "Multi-Valued Decision Diagrams: Theory and Applications", Multiple-Valued Logic, 4 (1-2):9-62, 1998, which is hereby incorporated by reference in its entirety.

Generally, BMDs are a generalization of BDDs to include also domains over integers and real numbers. BMDs are disclosed in R. E. Bryant et al., "Verification of Arithmetic Circuits with Binary Moment Diagrams", Proceedings of the 32nd ACM/IEEE design automation conference, 535-541, 1995, which is hereby incorporated by reference in its entirety.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method performed by a processor, the method comprising:
   obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and
   enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

2. The computer-implemented method of claim 1, wherein said enhancing is performed with respect to a plurality of unassigned functional attributes, thereby assigning value to more than one unassigned functional attribute.

3. The computer-implemented method of claim 1, wherein with respect to a first functional attribute there is only one valid assignment and with respect to a second functional attribute there are two or more valid assignments; and wherein the enhanced partial coverage task includes an assignment to the first functional attribute and the second functional attribute is unassigned.

4. The computer-implemented method of claim 1, wherein said enhancing comprises:
   determining a first valid value that can be assigned to the functional attribute in the partial coverage task; and
   verifying that no second value can be assigned to the functional attribute in the partial coverage task without violating the one or more restrictions.

5. The computer-implemented method of claim 1, wherein said enhancing comprises:
   symbolically representing a valid test space according to the functional coverage model;
   excluding from the symbolic representation any coverage task that is not in line with the partial coverage task; and
   determining, based on the symbolic representation, whether there is exactly one valid assignment to the functional attribute.

6. The computer-implemented method of claim 5, wherein the symbolic representation utilizes Binary Decision Diagrams (BDDs); and wherein said excluding comprises conjuncting a first BDD representing the valid test space with a second BDD representing assignments of values to functional attributes according to the partial coverage tasks.

7. The computer-implemented method of claim 5,
   wherein the symbolic representation utilizes a Boolean Satisfiability Problem (SAT);
   wherein said excluding comprises introducing a constraint in the SAT requiring assignment of values in accordance with the partial coverage task; and
   solving the SAT to determine a value assignment to the functional attribute;
   modifying the SAT to a second SAT which requires the functional attribute be assigned a different value than the value assignment; and
   solving the second SAT, thereby determining whether or not the value is the only valid assignment to the functional attribute.

8. A computerized apparatus having a processor and a memory, the processor being adapted to perform the steps of:
   obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and
   enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

9. The computerized apparatus of claim 8, wherein said enhancing is performed with respect to a plurality of unassigned functional attributes, thereby assigning value to more than one unassigned functional attribute.

10. The computerized apparatus of claim 8, wherein with respect to a first functional attribute there is only one valid assignment and with respect to a second functional attribute there are two or more valid assignments; and wherein the enhanced partial coverage task includes an assignment to the first functional attribute and the second functional attribute is unassigned.

11. The computerized apparatus of claim 8, wherein said enhancing comprises:
   determining a first valid value that can be assigned to the functional attribute in the partial coverage task; and verifying that no second value can be assigned to the functional attribute in the partial coverage task without violating the one or more restrictions.

12. The computerized apparatus of claim 8, wherein said enhancing comprises:
symbolically representing a valid test space according to the functional coverage model;
excluding from the symbolic representation any coverage task that is not in line with the partial coverage task; and
determining, based on the symbolic representation, whether there is exactly one valid assignment to the functional attribute.

13. The computerized apparatus of claim 12, wherein the symbolic representation utilizes Binary Decision Diagrams (BDDs); and wherein said excluding comprises conju(Original) ncting a first BDD representing the valid test space with a second BDD representing assignments of values to functional attributes according to the partial coverage tasks.

14. The computerized apparatus of claim 12,
wherein the symbolic representation utilizes a Boolean Satisfiability Problem (SAT);
wherein said excluding comprises introducing a constraint in the SAT requiring assignment of values in accordance with the partial coverage task; and
solving the SAT to determine a value assignment to the functional attribute;
modifying the SAT to a second SAT which requires the functional attribute be assigned a different value than the value assignment; and
solving the second SAT, thereby determining whether or not the value is the only valid assignment to the functional attribute.

15. The computerized apparatus of claim 12 being operatively coupled to a SAT Solver; and wherein the symbolic representation utilizes a satisfiability problem.

16. The computerized apparatus of claim 12 being operatively coupled to a Binary Decision Diagram (BDD) module configured to manipulate BDD data structures; and wherein the symbolic representation uses a BDD.

17. A computer program product comprising a non-transitory computer readable medium retaining program instructions, which instructions when read by a processor, case the processor to performs the steps of:
obtaining a partial coverage task defining a test with respect to a functional coverage model of a System Under Test (SUT), wherein the functional coverage model defining functional attributes and respective domains thereof, wherein the functional coverage model further defining one or more restrictions on value combinations of the functional attributes; and
enhancing the partial coverage task to include an assignment of a value to a functional attribute, wherein the functional attribute is unassigned in the partial coverage task, wherein the value is an only valid assignment to the functional attribute in view of assignments of other functional attributes and in view of the restrictions.

18. The computer program product of claim 17, wherein said enhancing is performed with respect to a plurality of unassigned functional attributes, thereby assigning value to more than one unassigned functional attribute.

19. The computer program product of claim 17, wherein with respect to a first functional attribute there is only one valid assignment and with respect to a second functional attribute there are two or more valid assignments; and wherein the enhanced partial coverage task includes an assignment to the first functional attribute and the second functional attribute is unassigned.

20. The computer program product of claim 17, wherein said enhancing comprises:
determining a first valid value that can be assigned to the functional attribute in the partial coverage task; and
verifying that no second value can be assigned to the functional attribute in the partial coverage task without violating the one or more restrictions.

* * * * *